(12) United States Patent
Buehler et al.

(10) Patent No.: US 7,734,375 B2
(45) Date of Patent: Jun. 8, 2010

(54) ROBOT AND ROBOT LEG MECHANISM

(75) Inventors: Martin Buehler, Watertown, MA (US); Aaron Saunders, Montreal (CA)

(73) Assignee: Boston Dynamics, Waltham, MA (US)

( * ) Notice: Subject to any disclaimer, the term of this patent is extended or adjusted under 35 U.S.C. 154(b) by 1255 days.

(21) Appl. No.: 10/864,715

(22) Filed: Jun. 9, 2004

(65) Prior Publication Data

US 2005/0275367 A1    Dec. 15, 2005

(51) Int. Cl.
*G06F 19/00* (2006.01)

(52) U.S. Cl. .................. 700/245; 700/248; 700/261; 700/900; 74/23; 74/490.01; 74/490.05; 74/380; 74/385; 74/415; 74/417; 74/423; 74/421 A; 74/665 C; 74/665 M; 74/665 P; 318/568.2; 318/568.12; 318/568.11; 901/1; 901/8; 901/28; 901/26; 483/901; 273/440.1; 250/259.33

(58) Field of Classification Search .................. 700/245, 700/248, 261, 900; 901/1, 8, 28, 26; 74/490.01, 74/23, 490.05, 380, 385, 415, 417, 423, 421 A, 74/665 C, 665 M, 665 P; D21/578; 483/901; 320/DIG. 34; 318/568.2, 568.12, 568.11; 273/440.1; 250/559.33

See application file for complete search history.

(56) References Cited

U.S. PATENT DOCUMENTS

| | | | | | |
|---|---|---|---|---|---|
| 2,827,735 | A | * | 3/1958 | Grimm, Jr. | 446/356 |
| 2,924,042 | A | * | 2/1960 | Byrtus | 446/356 |
| 3,331,463 | A | * | 7/1967 | Kramer | 180/8.6 |
| 3,660,931 | A | * | 5/1972 | Gardel et al. | 446/355 |
| 4,365,437 | A | * | 12/1982 | Jameson | 446/355 |
| 4,480,495 | A | * | 11/1984 | Obama | 74/490.05 |
| 4,492,510 | A | * | 1/1985 | Tanii et al. | 414/733 |
| 4,565,487 | A | * | 1/1986 | Kroczynski | 414/730 |
| 4,594,652 | A | * | 6/1986 | Mattson | 700/56 |
| 4,612,996 | A | * | 9/1986 | Wolf et al. | 172/26 |
| 4,614,504 | A | * | 9/1986 | Yamasaki | 446/356 |
| 4,629,440 | A | * | 12/1986 | McKittrick et al. | 446/356 |
| 4,657,104 | A | * | 4/1987 | Holland | 180/211 |
| 4,662,465 | A | * | 5/1987 | Stewart | 180/8.1 |
| 4,761,114 | A | * | 8/1988 | Barland | 414/735 |
| 4,834,200 | A | * | 5/1989 | Kajita | 180/8.1 |
| 5,040,429 | A | * | 8/1991 | Del Castillo | 74/424 |
| 5,040,626 | A | * | 8/1991 | Paynter | 180/8.1 |
| 5,127,484 | A | * | 7/1992 | Bares et al. | 180/8.1 |
| 5,158,493 | A | * | 10/1992 | Morgrey | 446/355 |
| 5,263,382 | A | * | 11/1993 | Brooks et al. | 74/471 XY |
| 5,423,708 | A | * | 6/1995 | Allen | 446/356 |
| 5,644,204 | A | * | 7/1997 | Nagle | 318/568.12 |
| 5,685,383 | A | * | 11/1997 | Ferrante | 180/8.6 |
| 5,746,093 | A | * | 5/1998 | Poglitsch | 74/490.05 |
| 5,758,734 | A | * | 6/1998 | Hong et al. | 180/8.1 |
| 5,807,011 | A | * | 9/1998 | Hong et al. | 403/62 |
| 6,238,264 | B1 | * | 5/2001 | Kazami et al. | 446/356 |
| 6,336,374 | B1 | * | 1/2002 | Brogardh et al. | 74/490.03 |
| 6,481,512 | B1 | * | 11/2002 | Nagatsuka | 180/8.1 |
| 6,481,513 | B2 | * | 11/2002 | Buehler et al. | 180/8.6 |

(Continued)

*Primary Examiner*—Khoi Tran
*Assistant Examiner*—Jorge O Peche
(74) *Attorney, Agent, or Firm*—Iandiorio Teska & Coleman

(57) ABSTRACT

A robot with a body, at least one leg on each side of the body, and a hip connecting the leg to the body. The hip is configured to abduct and adduct the leg. A linkage is configured to rotate the leg along a predetermined path.

13 Claims, 17 Drawing Sheets

U.S. PATENT DOCUMENTS

| | | | |
|---|---|---|---|
| 6,488,560 B2 * | 12/2002 | Nishikawa | 446/356 |
| 6,564,888 B1 * | 5/2003 | Gomi et al. | 180/8.6 |
| 6,611,734 B2 * | 8/2003 | Parker et al. | 700/258 |
| 6,620,021 B2 * | 9/2003 | Liu | 446/330 |
| 6,636,781 B1 * | 10/2003 | Shen et al. | 700/248 |
| 6,658,962 B1 * | 12/2003 | Rosheim | 74/490.05 |
| 6,757,586 B2 * | 6/2004 | Milojevic et al. | 700/245 |
| 6,782,308 B2 * | 8/2004 | Yamaura | 700/245 |
| 6,866,557 B2 * | 3/2005 | Randall | 446/356 |
| 6,871,563 B2 * | 3/2005 | Choset et al. | 74/490.05 |
| D512,086 S * | 11/2005 | Dirks | D15/199 |
| 6,964,309 B2 * | 11/2005 | Quinn et al. | 180/8.1 |
| 7,039,500 B2 * | 5/2006 | Milojevic et al. | 700/245 |
| 7,240,747 B2 * | 7/2007 | Miyazaki et al. | 180/8.6 |
| 7,270,589 B1 * | 9/2007 | Brown et al. | 446/317 |
| 7,429,844 B2 * | 9/2008 | Kono et al. | 318/625 |
| 7,498,758 B2 * | 3/2009 | Baba et al. | 318/568.12 |
| 2001/0054518 A1 * | 12/2001 | Buehler et al. | 180/8.1 |
| 2002/0179342 A1 * | 12/2002 | Quinn et al. | 180/8.1 |
| 2002/0193045 A1 * | 12/2002 | Lee et al. | 446/330 |
| 2003/0004611 A1 * | 1/2003 | McKinney et al. | 700/258 |
| 2003/0045967 A1 * | 3/2003 | Milojevic et al. | 700/245 |
| 2003/0188597 A1 * | 10/2003 | Kor | 74/490.01 |
| 2003/0208303 A1 * | 11/2003 | Okamoto et al. | 700/245 |
| 2004/0016315 A1 * | 1/2004 | Nakamura et al. | 74/490.05 |
| 2004/0074679 A1 * | 4/2004 | Miyazaki et al. | 180/8.1 |
| 2004/0127140 A1 * | 7/2004 | Kelly et al. | 446/268 |
| 2004/0261411 A1 * | 12/2004 | MacGregor | 60/527 |
| 2006/0028164 A1 * | 2/2006 | Kono et al. | 318/625 |
| 2008/0150465 A1 * | 6/2008 | Baba et al. | 318/568.12 |

* cited by examiner

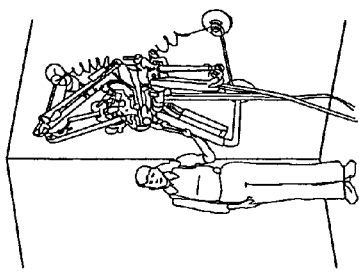
FIG. 3
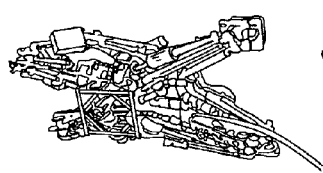
FIG. 2
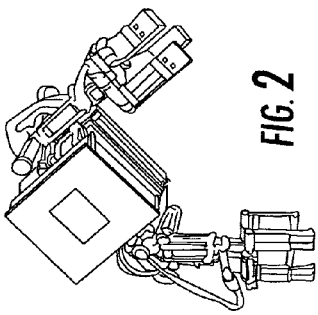
FIG. 1
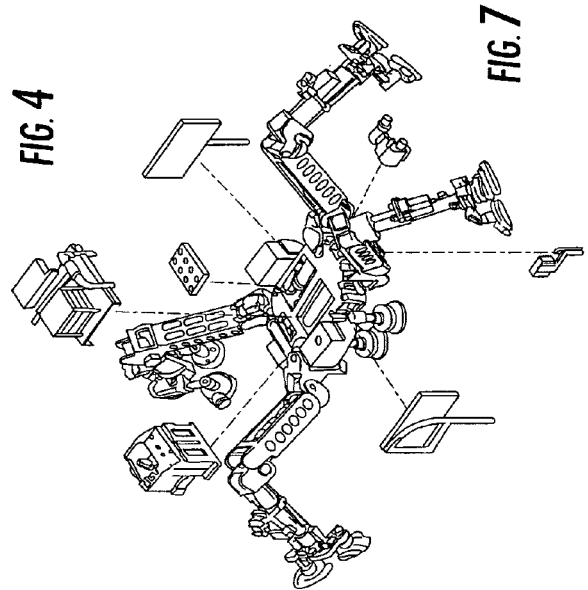
FIG. 4
FIG. 7
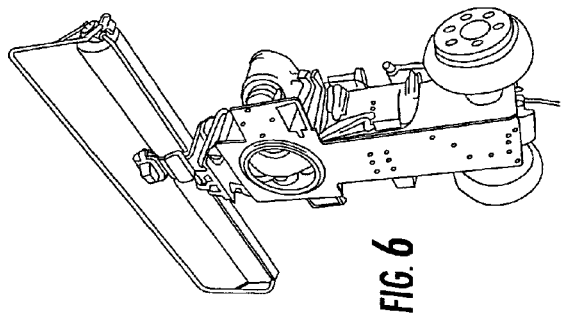
FIG. 6
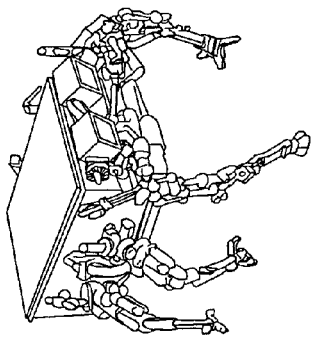
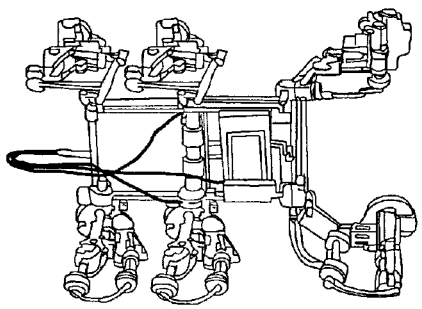
FIG. 5

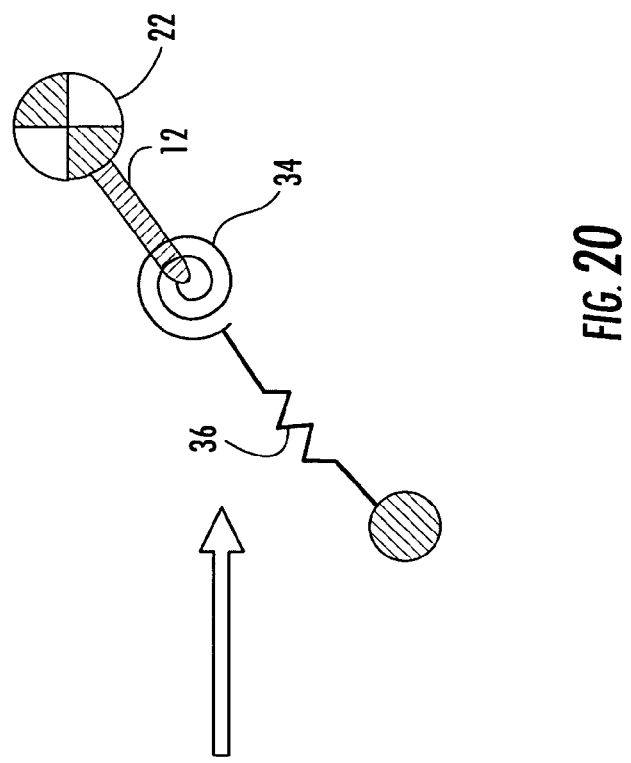
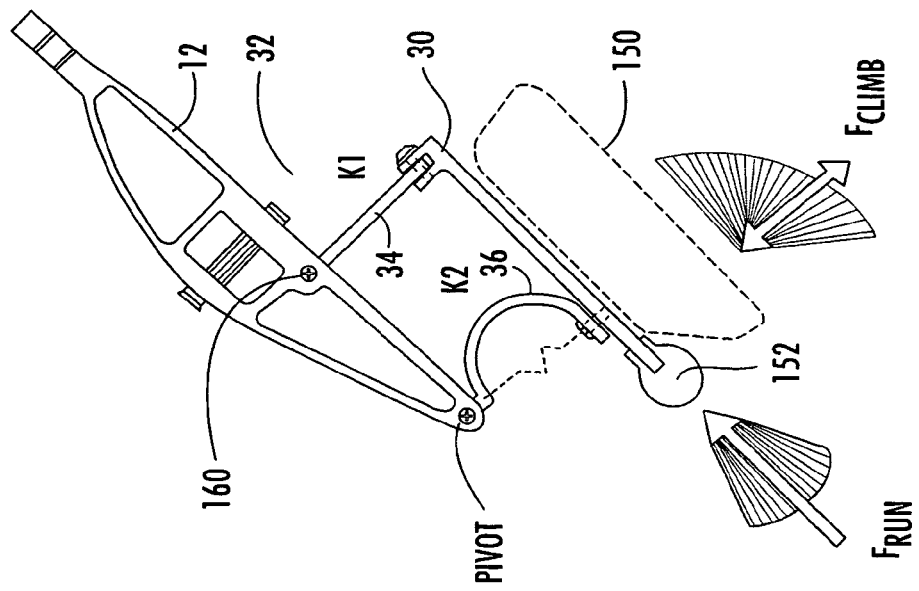
FIG. 19
FIG. 20

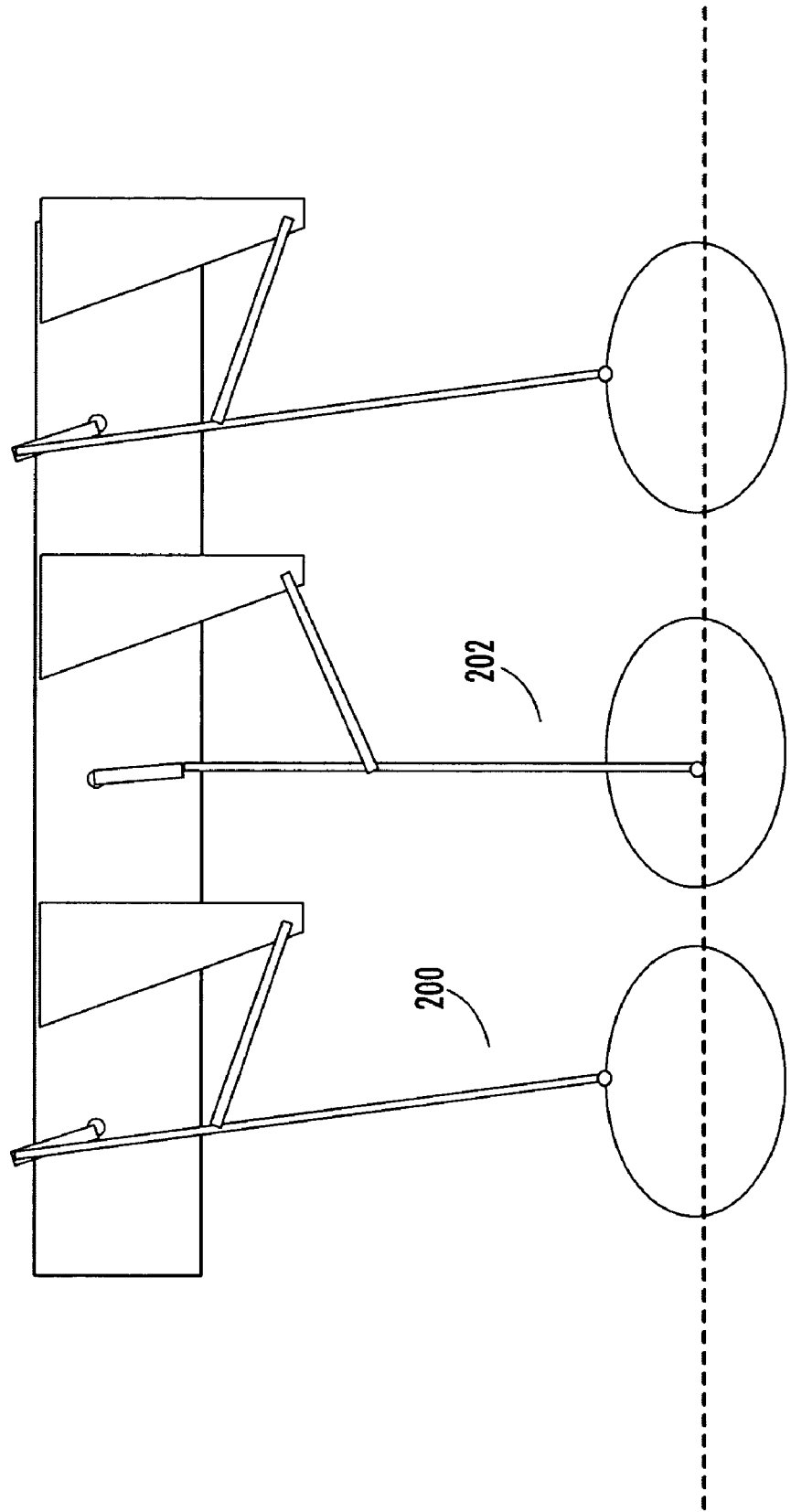

ROBOT AND ROBOT LEG MECHANISM

GOVERNMENT RIGHTS

This invention was made with U.S. Government support under Contract No. DARPA/SPAWAR N66001-03-C-8045. The Government may have certain rights in the subject invention.

FIELD OF THE INVENTION

This invention relates to a robot and a robot leg mechanism which allows the robot to both climb inclined and vertical surfaces and walk or run on other (e.g., horizontal) surfaces.

BACKGROUND OF THE INVENTION

Leg driven robots can be configured to walk and/or run and even climb. Many prior art robots are designed to be highly versatile but at the expense of complexity. With numerous joints and degrees of freedom, prior art robots require complex linkages and numerous motors and encoders rendering them bulky, heavy, slow, expensive, and unreliable. And, even the most versatile robots are not well suited to both walking and climbing. For climbing robots, weight is a critical design factor. For all robots, speed, cost, complexity, compactness, and reliability are often critical design factors.

SUMMARY OF THE INVENTION

It is therefore an object of this invention to provide a robot and a robot leg mechanism which allows the robot to both walk and/or run and also to climb.

It is a further object of this invention to provide such a robot which requires a minimum of actuators.

It is a further object of this invention to provide such a robot which can be made very compact.

It is a further object of this invention to provide such a robot which can be made lightweight.

It is a further object of this invention to provide such a robot which can be manufactured at a low cost.

It is a further object of this invention to provide such a robot which is highly reliable.

The invention results from the realization that a simpler and yet more versatile robot is effected by legs which abduct widely to assume a sprawled posture for wall climbing and which adduct to assume an upright walking posture combined with a linkage configured to operate in connection with the abduction/adduction hip mechanism to move the legs along a predetermined path optimal for wall climbing.

The subject invention, however, in other embodiments, need not achieve all these objectives and the claims hereof are not limited to structures or methods capable of achieving said objectives.

In one embodiment, this invention features a robot comprising a body, at least one leg on each side of the body, a hip connecting the leg to the body and configured to abduct and adduct the leg, and a linkage configured to rotate the leg along a predetermined path. In the preferred embodiment, hip includes a differential gear assembly including a frame portion rotatably connected to the body, a pair of coupler gears, and an output gear engaging the pair of coupler gears. The preferred linkage defines a four bar linkage including a crank rotatably driven by the output gear and rotatably connected to the leg. A first member is pivotably connected to the leg and a second member pivotably connected to the first member and connected to the frame portion.

Typically, there is an actuator for each coupler gear such as motors each including a pinion gear engaging an input gear which is fixed to a coupler gear. In one compact design, the motors are arranged serially along the length of the body and the motors alternate in the series for legs on opposite sides of the body.

A controller operates the actuators and is programmed to rotate the actuators in the same direction and at the same speed to rotate the frame and abduct and adduct a leg, rotate the actuators in the opposite directions and at the same speed to turn the output gear, drive the crank, and rotate the leg along the predetermined path, and rotate the actuators in the same or opposite directions at different speeds to both rotate the frame portion and turn the output gear. Preferably, the controller is further programmed to widely abduct the legs to lower the body and to fully adduct the legs to raise the body.

A typical robot further includes a foot assembly connected to the leg and a compliant interface between the foot assembly and the leg. The preferred compliant interface includes a first spring such as a leaf spring configured to bend in the direction of the longitudinal axis of the leg. The preferred compliant interface also includes a second spring such as a torsional spring configured to flex in a direction transverse to the longitudinal axis of the leg.

The foot assembly may include a walking toe and a separate climbing toe with at least one means of attaching to a vertical climbing surface, such as dry or wet adhesion materials, a gripping mechanism, suction mechanism, or a magnetic mechanism for vertical climbing. Typically, there are at least two or three legs on each side of the body.

A robot leg mechanism in accordance with the subject invention includes a leg, a hip connected to the leg and configured to abduct and adduct the leg, a linkage configured to rotate the leg along a predetermined path, a foot assembly, and a compliant interface between the leg and the foot assembly.

In the preferred embodiment, the hip includes a rotatable frame portion, a pair of coupler gears, and an output gear engaging the pair of coupler gears. The preferred linkage includes a crank rotatably driven by the output gear and rotatably connected to the leg, a first member pivotably connected to the leg, and a second member pivotably connected to the first member and connected to the frame portion.

One compliant interface includes a first spring such as a leaf spring configured to bend in the direction of the longitudinal axis of the leg. The compliant interface may also include a second spring such as a torsional spring configured to flex in a direction transverse to the longitudinal axis of the leg.

The preferred foot assembly includes a walking toe and a separate climbing toe with at least one means of attaching to a vertical climbing surface, such as dry or wet adhesion materials, a gripping mechanism, suction mechanism, or a magnetic mechanism for vertical climbing.

BRIEF DESCRIPTION OF THE DRAWINGS

Other objects, features and advantages will occur to those skilled in the art from the following description of a preferred embodiment and the accompanying drawings, in which:

FIGS. 1-7 are schematic three dimensional views showing several prior art wall climbing robots;

FIG. 19 is a schematic side view of an example of a foot assembly for a robot leg in accordance with the subject invention;

FIG. 20 is simplified functional diagram of the assembly shown in FIG. 19;

FIGS. 23A-23B are schematic side views of a simulation depicting an example of a robot in accordance with the subject invention in the walking/running configuration.

DISCLOSURE OF THE PREFERRED EMBODIMENT(S)

Figure 8:
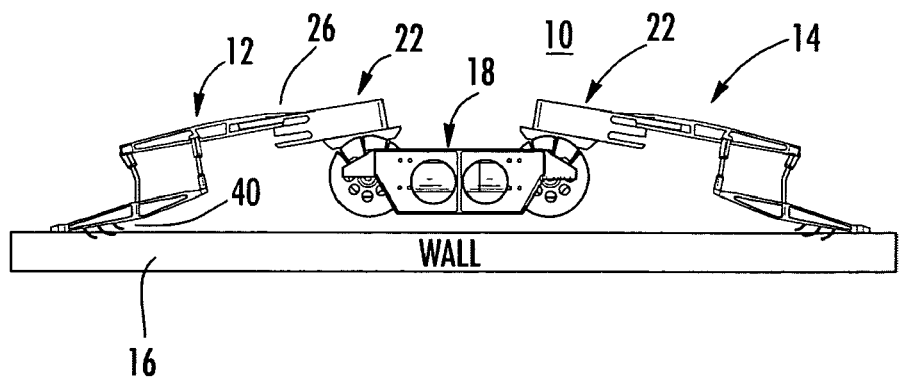
FIG. 8 is a front schematic view showing an embodiment of the robot of the subject invention climbing a wall.

Aside from the preferred embodiment or embodiments disclosed below, this invention is capable of other embodiments and of being practiced or being carried out in various ways. Thus, it is to be understood that the invention is not limited in its application to the details of construction and the arrangements of components set forth in the following description or illustrated in the drawings. If only one embodiment is described herein, the claims hereof are not to be limited to that embodiment. Moreover, the claims hereof are not to be read restrictively unless there is clear and convincing evidence manifesting a certain exclusion, restriction, or disclaimer.

FIGS. 1-7 are depictions of various prior art climbing robots. As delineated in the Background section above, many prior art robots of this type are not well suited to walking or running motions. Also some of these prior art robots are fairly versatile but at the expense of complexity: there are numerous joints and degrees of freedom for the legs that require complex linkages and numerous motors and encoders rendering the robot bulky, heavy, slow, expensive, and unreliable.

Figure 9:
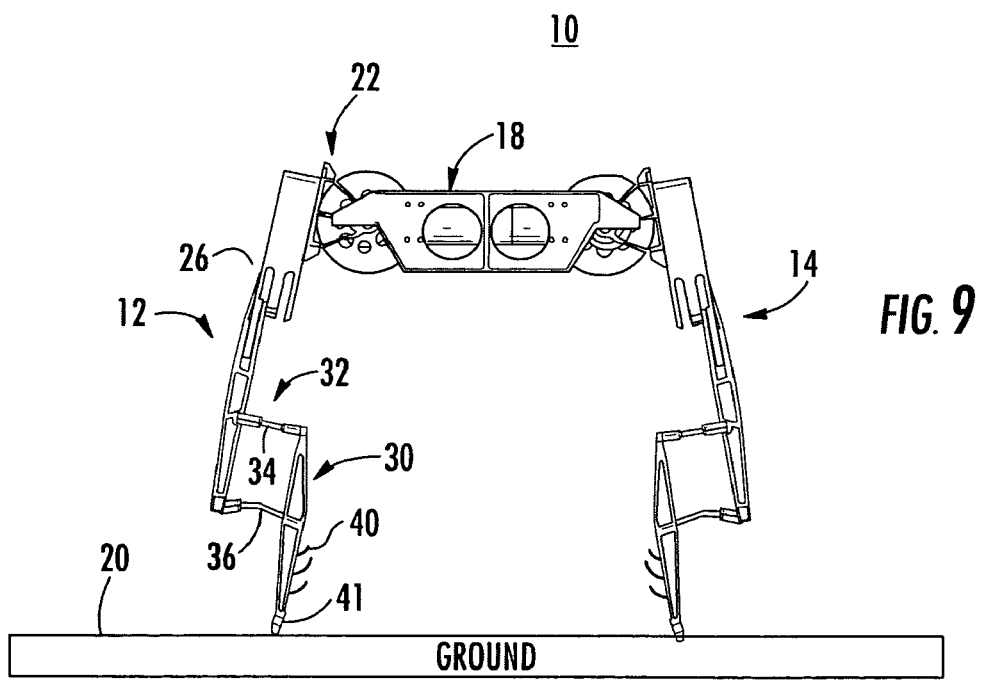
FIG. 9 is a schematic front view showing the robot of FIG. 8 in a more upright posture for walking or running along a surface.

Robot 10, FIG. 8 in accordance with this invention is able to attain a sprawled posture with legs 12 and 14 widely abducted lowering body 18 as shown in order to climb a steep or vertical surface (e.g., a wall) 16. As shown in FIG. 9, robot 10 is also able to attain an upright posture with legs 12 and 14 fully or more fully adducted to raise body 18 in order to walk or run on surface 20. Hip 22 connects leg 12 to body 18 and is configured to abduct or adduct leg 12 as it climbs a vertical surface when body 18 is lowered as shown in FIG. 8. Linkage 26 rotates leg 12 to define a predetermined path, preferably an ellipsoidal trajectory which propels the robot upward. Linkage 26 and hip 22 produce an inward gripping force as well. The abduction/adduction motion lifts the feet of the robot off the ground when necessary before the legs are swept backwards and also pushes the feet into the wall at the desired instant along the foot trajectory. For wall descent, the reverse procedure applies.

When not climbing, hip 22 fully adducts the legs raising body 18 as shown in FIG. 9 and linkage 26 then enables leg 12 to mimic a walking motion. Hip 22 and linkage 26 also allows body 18 to raise and lower when not climbing to clear obstacles or to traverse under obstacles. Thus, robot 10 can walk in the posture shown in FIG. 8 or in FIG. 9 or on any surface and in any posture between the postures shown in FIGS. 8 and 9.

Foot assembly 30 is typically connected to leg 12 via compliant interface 32 which, in one embodiment, includes leaf spring 34 configured to bend in the direction of the longitudinal axis of leg 12. Leaf spring 34 may be a stiff composite beam member designed to provide radial compliance for leg 12 during climbing operations as gripper claws 40 of foot assembly 30 (FIG. 8) engage wall 16. Compliant interface 32 may also include torsional spring 36 configured to flex in a direction transverse to the longitudinal axis of the leg during ground operations (FIG. 9). Other possible foot assembly configurations for climbing operations include effectors such as wet or dry adhesion materials, a suction mechanism and/or a magnetic mechanism known to those skilled in the art (See FIGS. 3, 5, and 7). Foot assembly 30, FIG. 9 may include walking toe 41 and a separate climbing toe effector.

Figure 10:
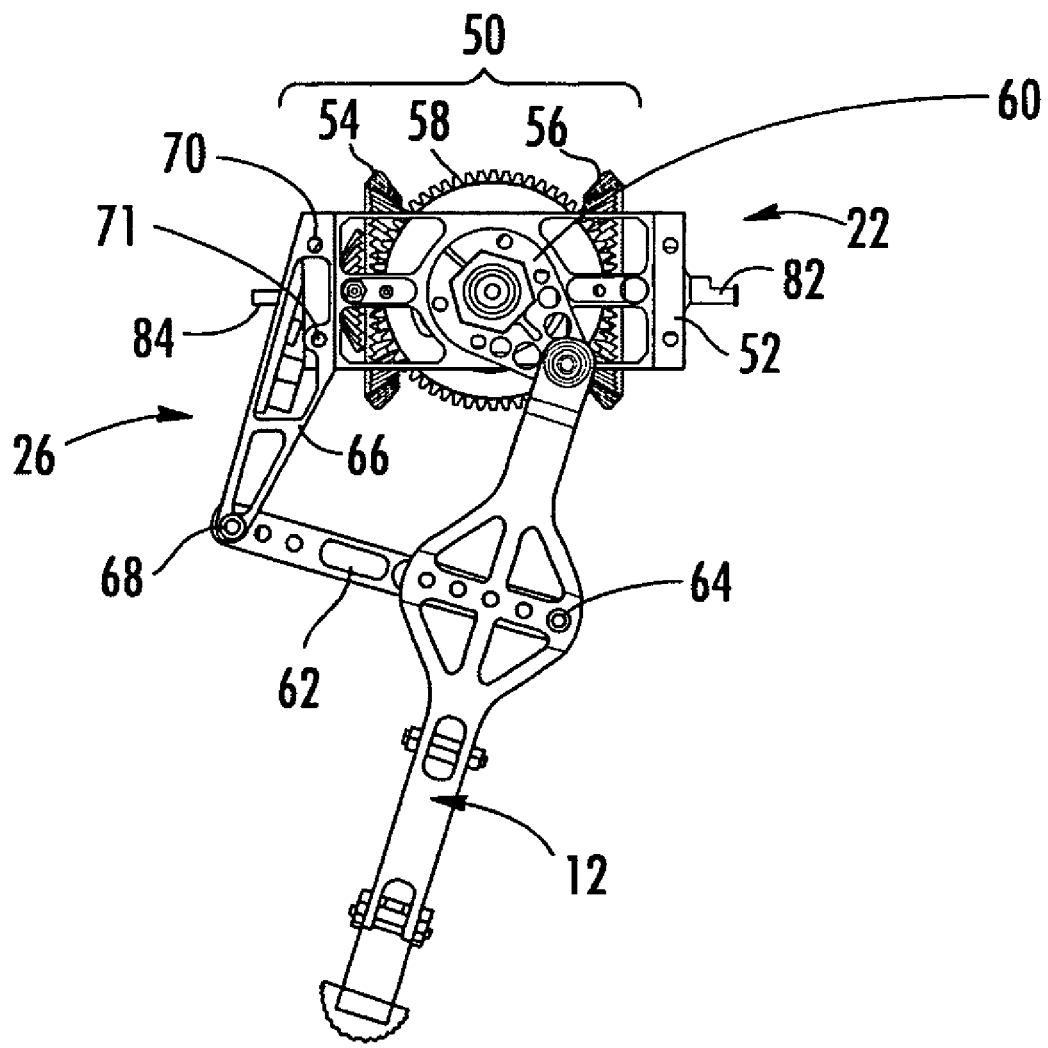
FIG. 10 is a schematic three dimensional front view of one preferred robot leg assembly in accordance with the subject invention.

In the preferred embodiment, hip 22 includes differential gear assembly 50, FIG. 10 with frame portion 52 rotatably connected to the robot body, coupler gears 54 and 56, and output gear 58 engaging both coupler gears. Output gear 58 drives crank 60 which forms a part of a four bar linkage defined by frame 52, member 62 pivotably connected to leg 12 at pivot point 64, and member 66 pivotably connected to member 62 at pivot point 68 and rigidly connected to frame 52 at points 70 and 71.

Figure 11:
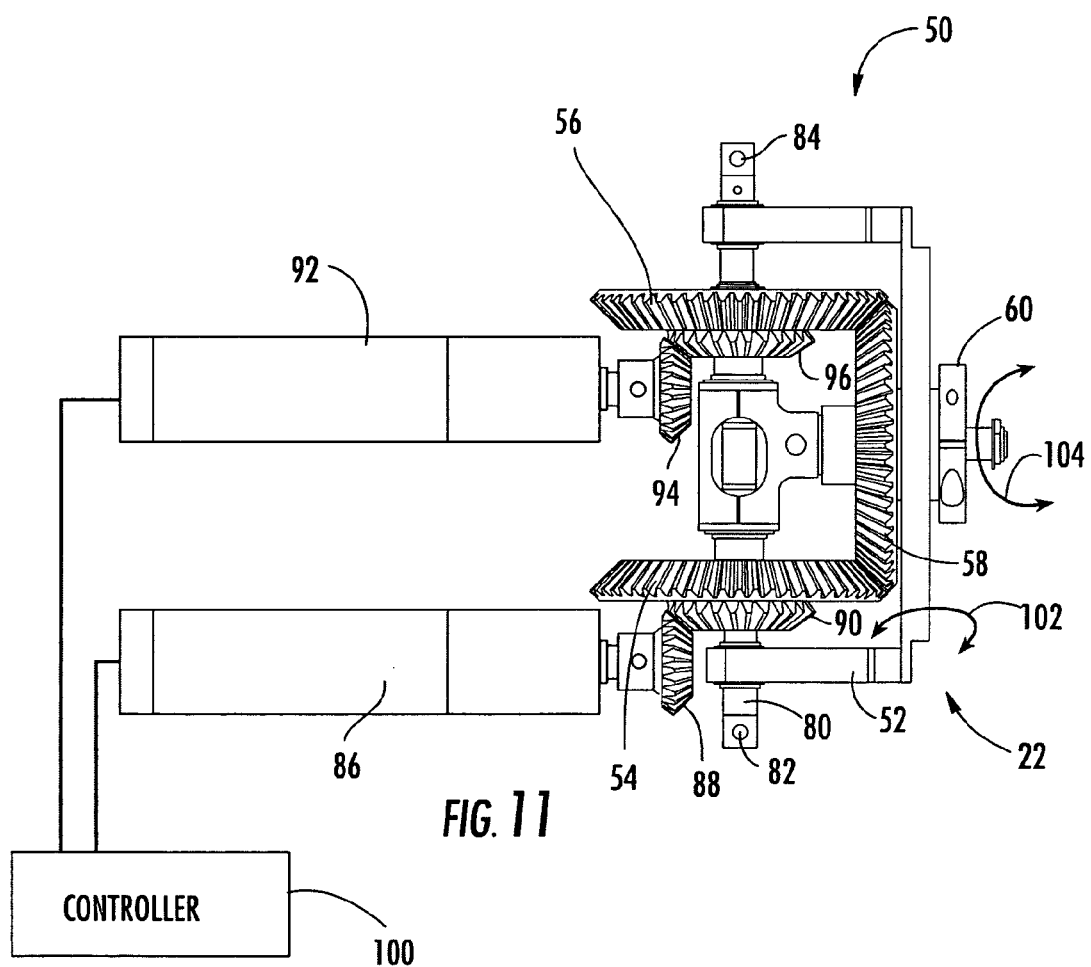
FIG. 11 is three dimensional schematic top view of the robot leg assembly shown in FIG. 10 and, in addition, showing the actuators used in accordance with the preferred embodiment for driving the leg mechanism.
Figure 14:
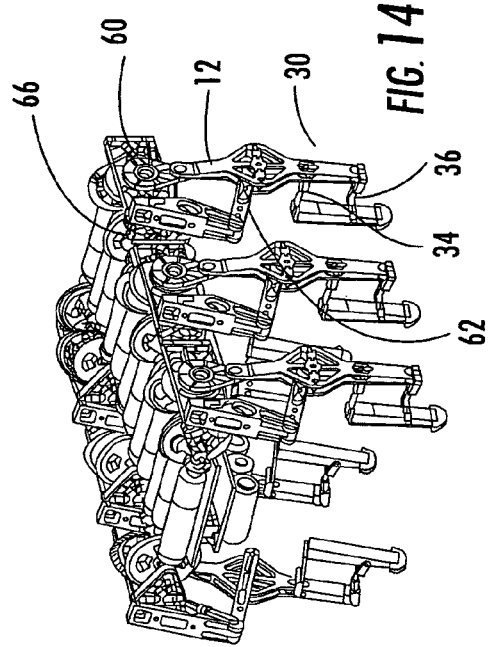
FIG. 14 is a three dimensional schematic side view of the robot shown in FIG. 12.
Figure 15:
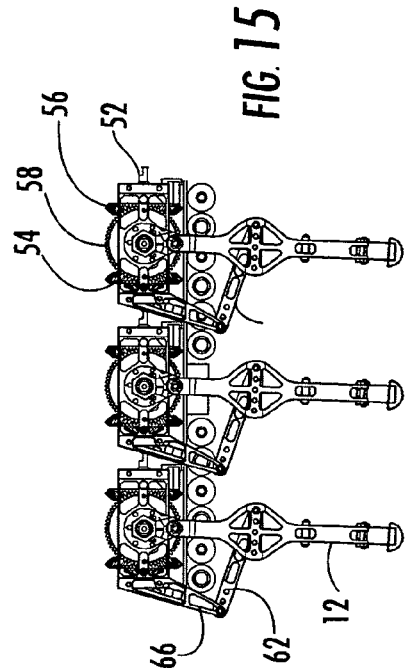
FIG. 15 is a side view of the robot shown in FIG. 12.

In one example, shaft 80, FIG. 11 of differential gear 50 is connected to the body of the robot at points 82 and 84. Motor 86 (e.g., MAXON RE16 118730 with integrated planetary gear MAXON 118185) includes pinion gear 88 which drives input gear 90 fixed to coupler gear 54. Motor 92 includes pinion gear 94 which drives input gear 96 fixed to coupler gear 56. Controller 100 is programmed to rotate motors 86 and 92 in the same direction and at the same speed in which case frame 52 rotates around shaft 80, in and out of the plane of FIG. 11, in the direction of arrow 102 to abduct and adduct the leg attached to hip 22. Controller 100 is also programmed to rotate motors 86 and 92 in opposite directions at the same speed—an action which turns output gear 58 to drive crank 60 and rotates the leg in and out of the plane of FIG. 11 in the direction shown by arrow 104. When controller 100 controls motors 86 and 92 to rotate in the same or opposite directions at different speeds, frame portion 102 is rotated as is crank member 60. Controller 100 is also programmed to widely abduct the legs as shown in FIG. 8 so that the robot attains a sprawled wall climbing posture and also to more fully adduct the legs to raise the body as shown in FIG. 9.

FIGS. 12-15 show a particular example of a six-legged robot in accordance with the subject invention and shows how motors M1-M12 are arranged in series along the length of the body and how the motors alternate in the series for legs on opposite sides of the body. Thus, motors M1 and M3 operate hip joint 22A and motors M2 and M4 operate hip joint 22B.

Figure 12:
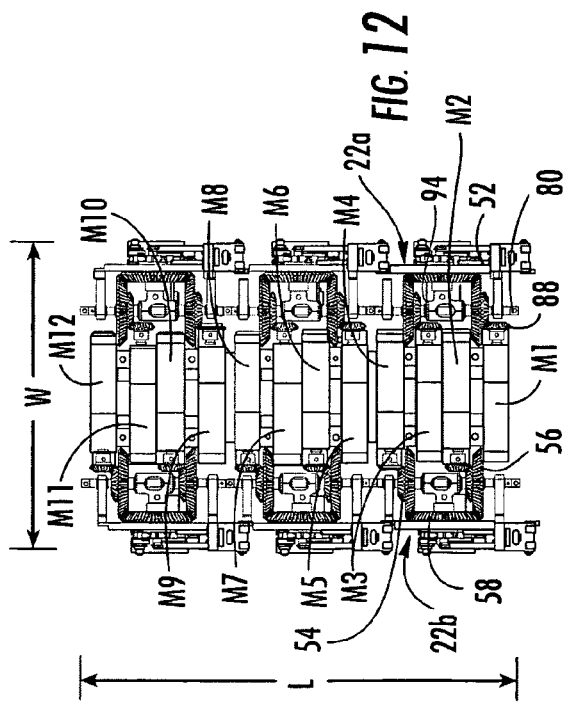
FIG. 12 is a schematic top view of a six legged robot in accordance with one example of the subject invention.
Figure 13:
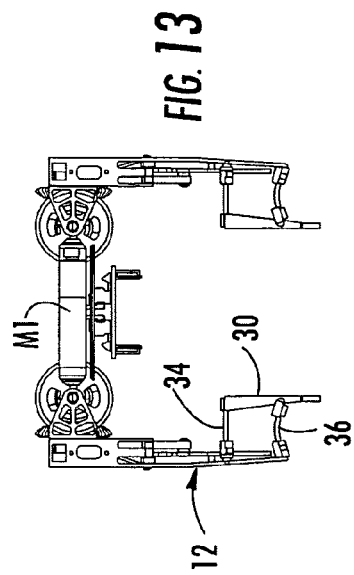
FIG. 13 is an end view of the robot shown in FIG. 12.

The result is a highly compact robot simple in design and yet highly versatile. The width dimension W of the robot shown in FIG. 12 is approximately 150 mm and the length dimension L shown in FIG. 12 is approximately 230 mm. It is expected that the robot shown in FIGS. 12-15 can be manufactured to weight less than 5 lbs. All the motors are preferably identical, and each motor pair driving each leg shares the load from both leg motors equally by virtue of the differential gear. This feature also allows more flexibility and power distribution during platform reconfiguration between the climbing and walking/running modes. The subject design addresses the opposing force requirements between climbing and walking/running modes allowing the robot to apply maximum torque to either degree of freedom while using the smallest possible motors. The structure used in FIGS. 12-15 is the same as that of FIGS. 8-11 and thus the individual components of each hip and leg assembly are not be repeated here.

Figure 16:
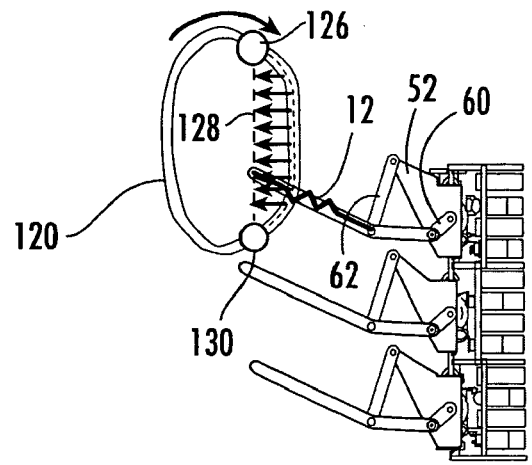
FIG. 16 is a depiction of the wall climbing leg path for a robot in accordance with the subject invention.
Figure 17:
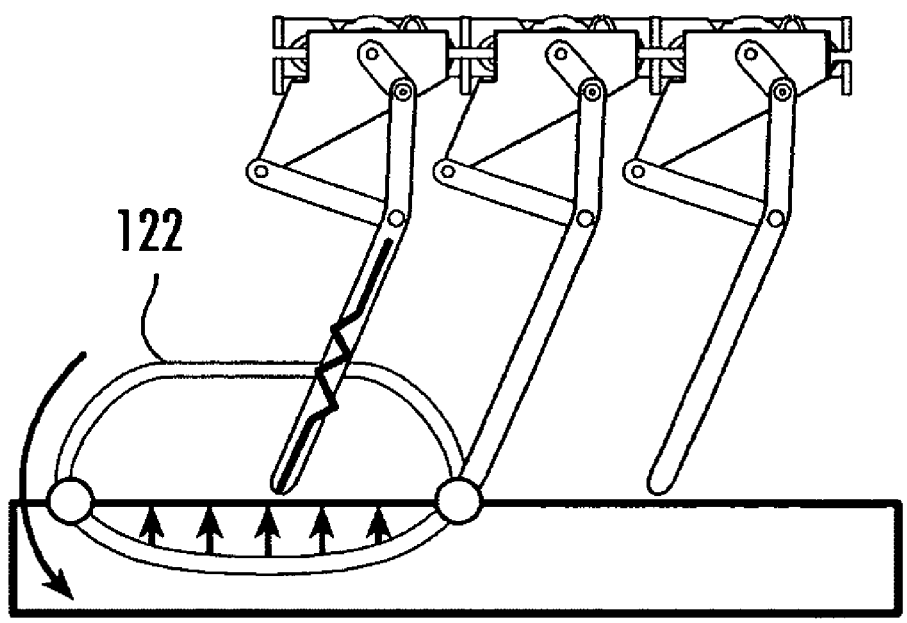
FIG. 17 is a view of the path of a robot leg in the walking/running configuration.

FIGS. 16 and 17 show the path of the end of a leg where the toe would attach due to the degrees of freedom provided by the hip and linkage mechanisms discussed above. During climbing operations, FIG. 16, the path of the leg is as shown at 120, FIG. 16. During terrestrial operation, the path of leg 12 is depicted as path 122, FIG. 17. As the foot of the leg contacts the wall at point 126, FIG. 16 by means of claw or other end effector, the toe is forced to deviate from path 120 and follow the straight line dashed path shown at 128. This creates, by a virtue of compliance in the leg as discussed above, lateral force which serves to engage the effectors with the wall and help support the robot weight during climbing. During ground operations the leg undergoes the same nominal path. Now however, ground contact occurs at the opposite side of the path as shown in FIG. 17. The weight of the robot, and possibly dynamic running forces, cause the leg to deviate from the nominal path shown in FIG. 17. The resulting deviation cause, by virtue of the radial leg compliance as discussed above, supporting forces for the robot weight, and also provide for smooth walking and running operation on flat and rugged terrain.

Figure 18:
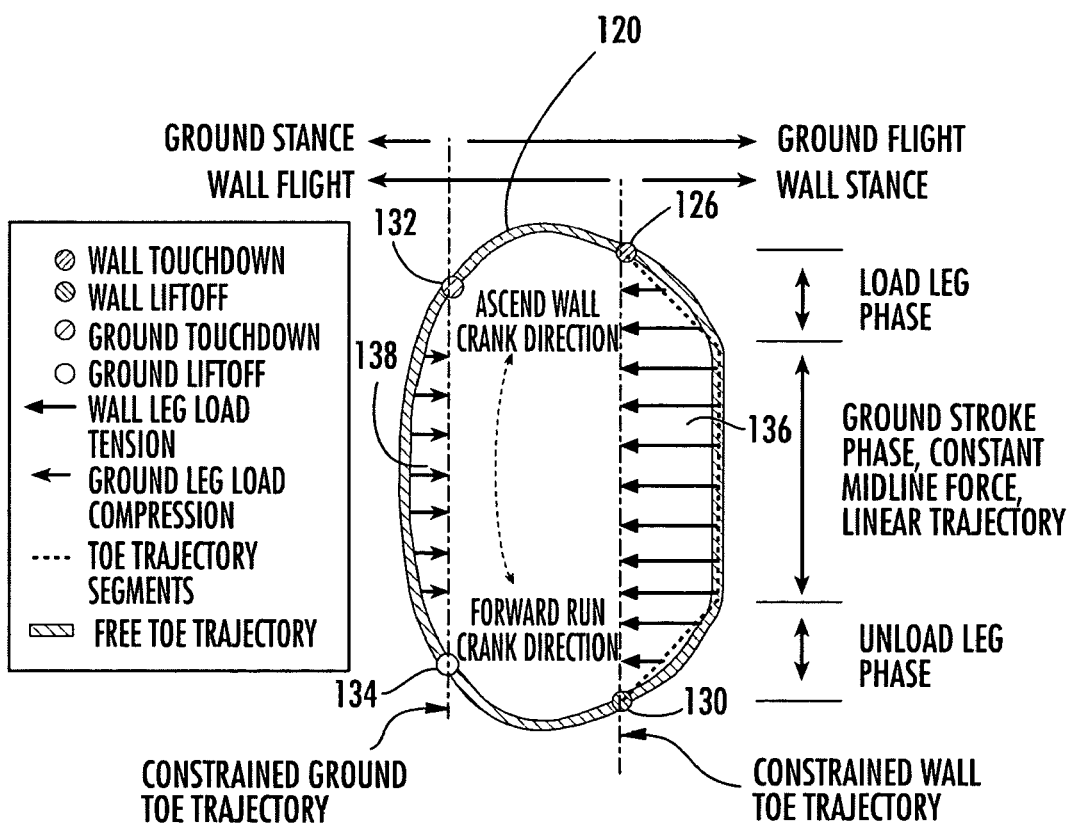
FIG. 18 is a view of the path of one example of a robot leg in accordance with the subject invention in both the walking/running and climbing configurations.

FIG. 18 combines the path of the leg during both wall and ground operations. The wall touch down is at point 126 and the wall lift off is at point 130. The ground touch down is at point 132 and the ground lift off is at point 134. Wall leg load tension is represented by the force vectors in area 136 and the ground leg load compression is represented by the force vectors in area 138.

FIG. 19 again shows leg 12, compliant interface 32, and foot assembly 30. Envelope 150 represents the climbing effectors which may be the claws discussed above, other gripping mechanisms, adhesive surfaces, suction mechanisms, or magnetic mechanisms. Walking toe 152 is preferably provided for walking/running operations. In FIG. 20, leaf spring 36 is represented as a linear spring and spring 34 is represented at the torsional spring. Spring 34 allows rotation of foot assembly 30 about point 160. If the spring constants associated with springs 34 and 36 have preselected different values, the compliance for the running and climbing modes of the leg are decoupled allowing one simple compliant interface to achieve two functions. In a preferred embodiment of robot 10, weighing 5 lbs, the prismatic spring stiffness is approximately 800 N/m and the equivalent rotational spring stiffness is 4 Nm/rad. Typically, the spring constant associated with beam 34 is much greater than the spring constant associated with leaf spring 36.

Figure 21:
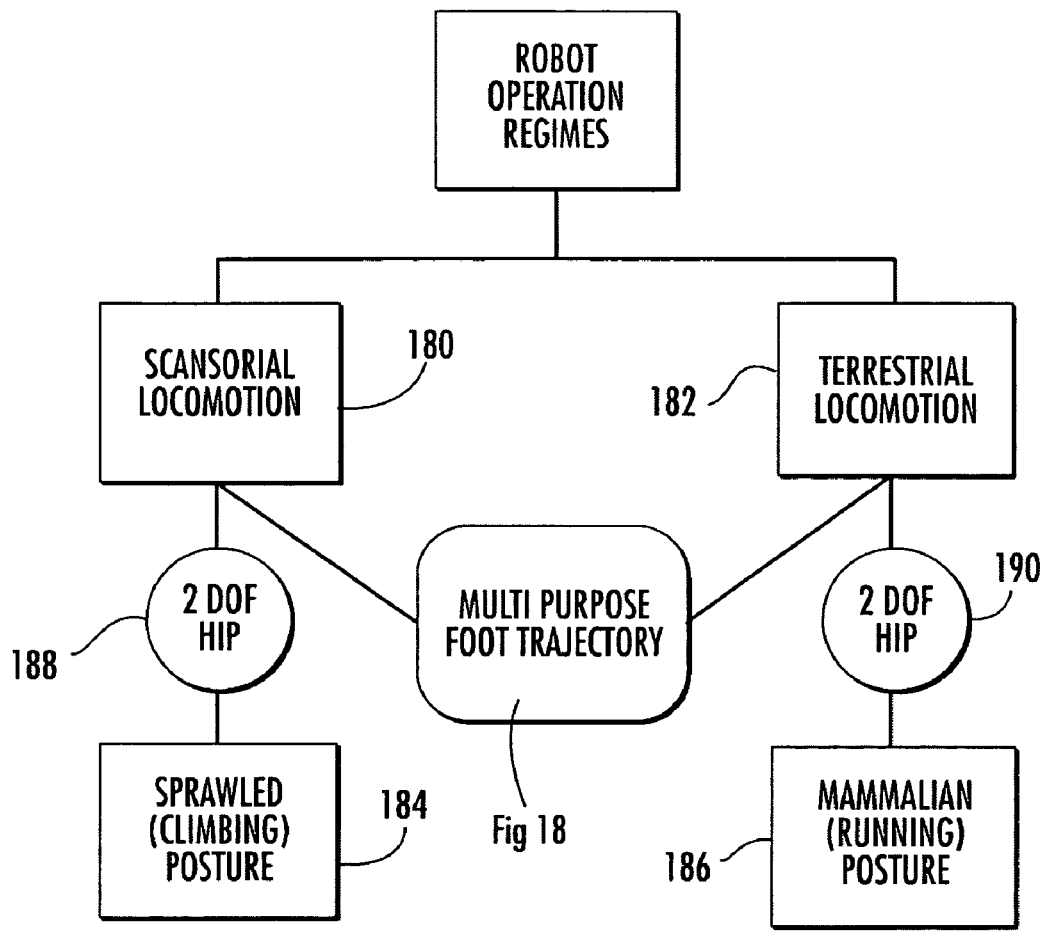
FIG. 21 is a block diagram showing several robot operating regimes in accordance with the subject invention.

FIG. 21 is a block diagram of the operating regimes associated with the robot controller where scansorial locomotion 180 refers to wall climbing locomotion and terrestrial locomotion 182 refers to ground based operations. There is a sprawl climbing posture mode 184 (see FIG. 8) and mammalian running posture mode (see FIG. 9). During both these postures and during both the scansorial and terrestrial locomotions, there are two degrees of hip freedom as shown at 188 and 190. The multi-purpose foot trajectory mode is discussed above with reference to FIGS. 16-18.

Figure 22A:
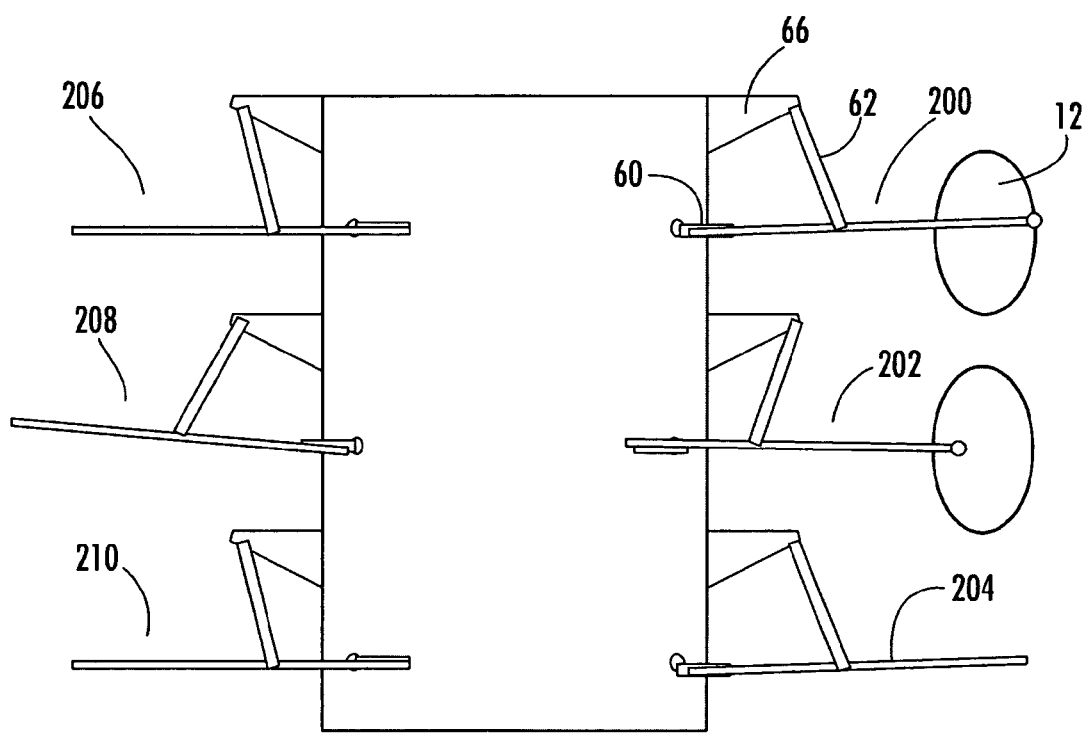
FIGS. 22A-22F are top views of a simulation depicting an embodiment of a robot in accordance with the subject invention in the wall climbing mode.
Figure 22B:
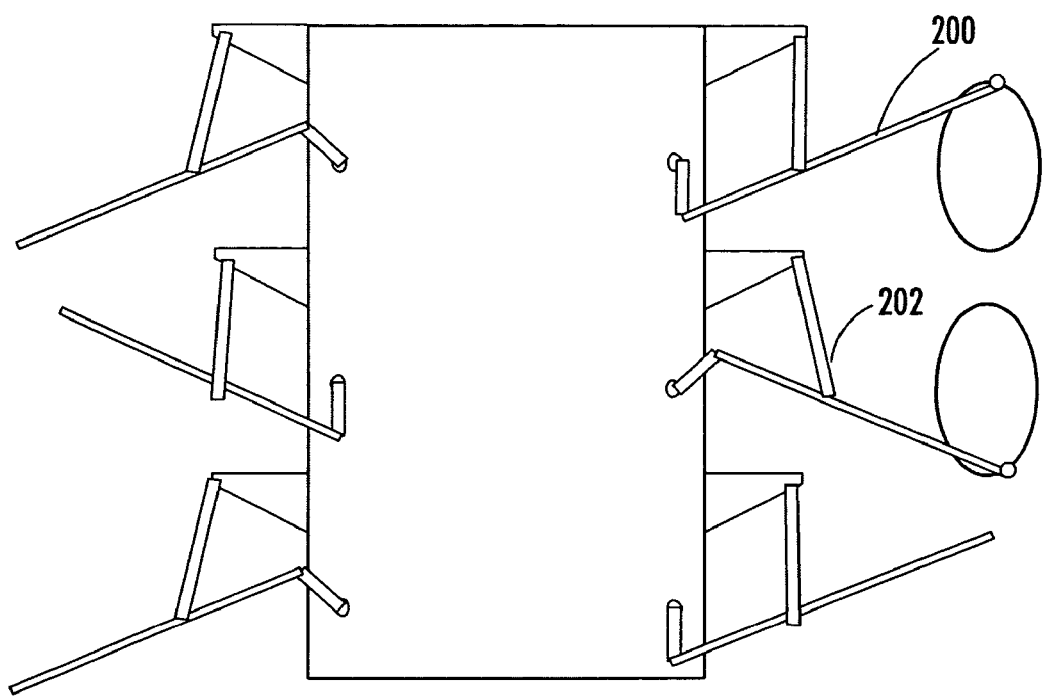
Figure 22C:
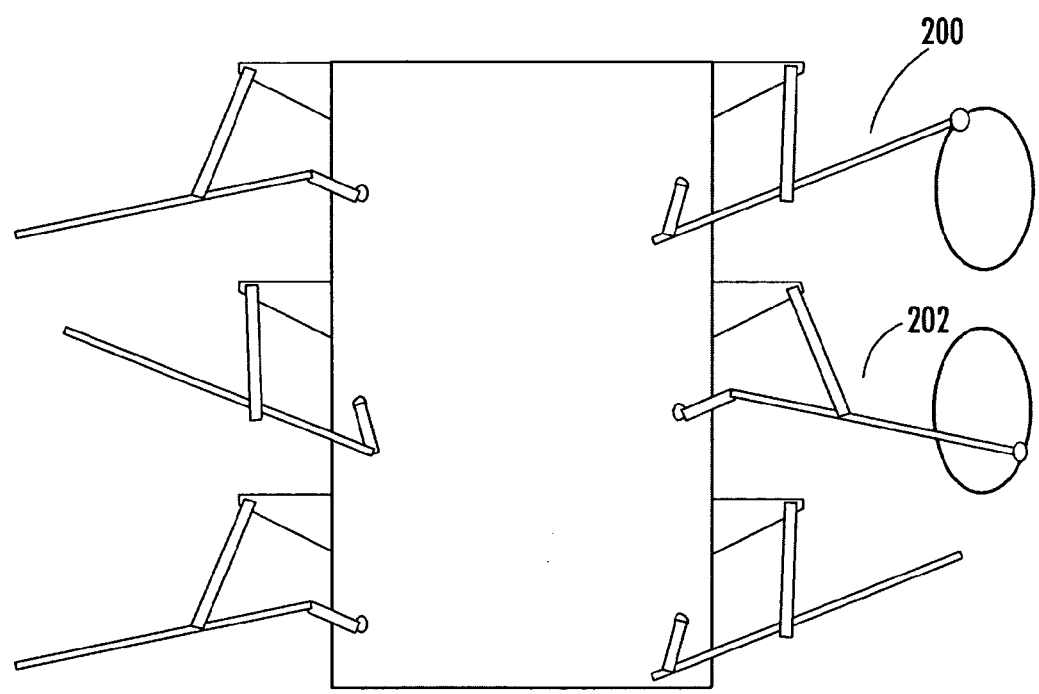
Figure 22D:
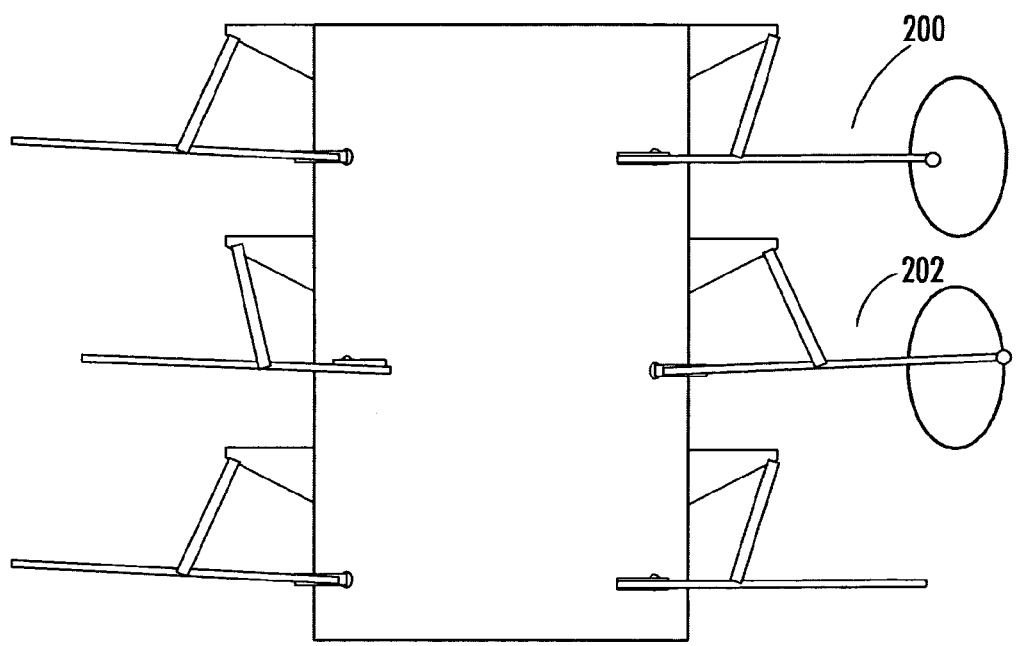
Figure 22E:
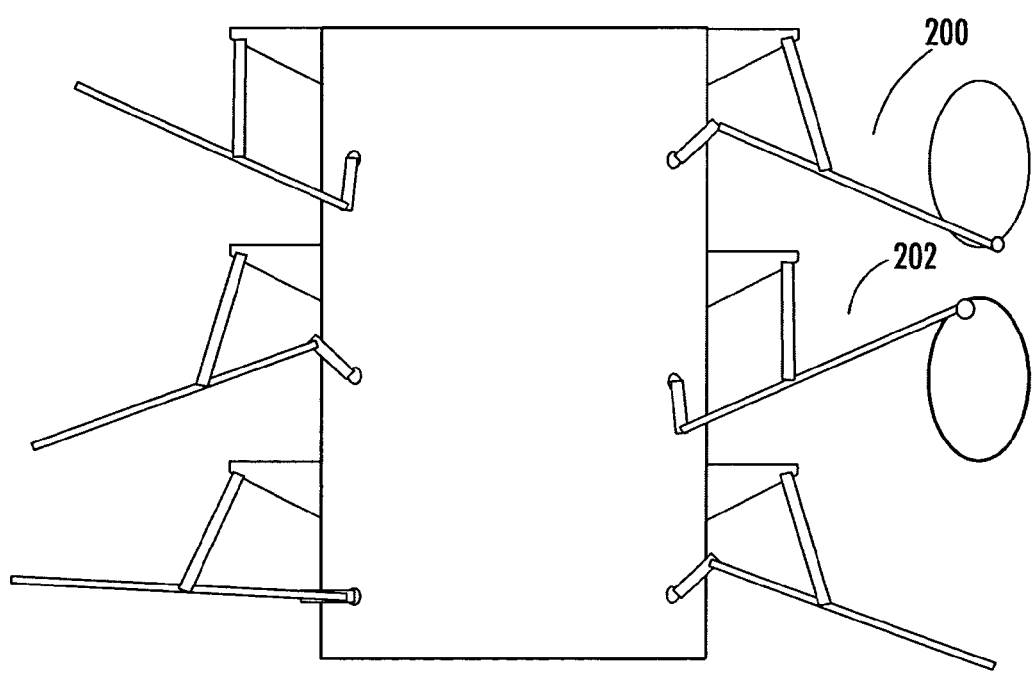
Figure 22F:
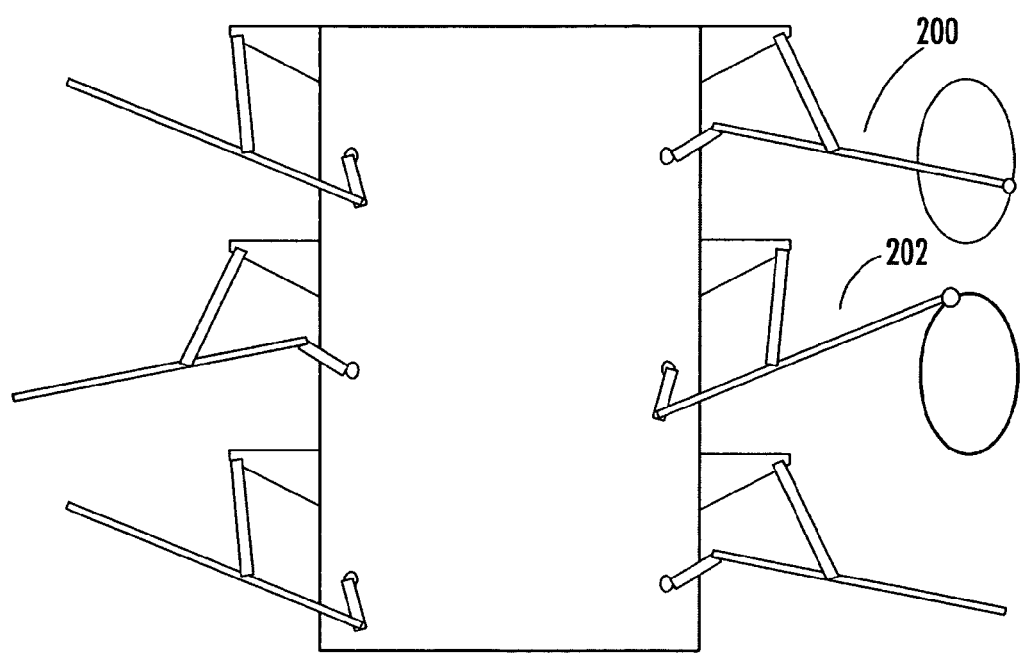

FIGS. 22A-22F illustrate a climbing (scansorial operation) cycle. In this illustrative example, the leg coordination (a gait) follows a so-called "Tripod Gait". In this gait, the feet of the legs 200, 204 and 208 form "tripod 1" and the feet of the legs 202, 206, 210 form "tripod 2". The three legs of a tripod move in unison, and form an alternating triangular pattern of support. For simplicity we refer to only leg 200 for tripod 1 and only leg 202 for tripod 2. In FIG. 22A, leg 200 is in mid stance and leg 202 in mid flight. In FIG. 22B, leg 200 is unloading and leg 202 has touchdowned on the wall. In FIG. 22C, leg 200 is in wall liftoff and leg 202 is loading. In FIG. 22D, leg 200 is in mid flight and leg 202 is in mid stance. In FIG. 22E, leg 200 is in wall touchdown and leg 202 is unloading. In FIG. 22F, leg 200 is loading and leg 202 is in wall liftoff.

Other climbing gaits are possible as well, for example, where corresponding left and right legs move together, and at least four legs are attached to the climbing surface at any time. Furthermore, a fast dynamic climbing gait might have periods of time where none of the legs are attached to the wall, and where one tripod of feet has already lifted off the wall, before the other tripod of feet is attached to the wall.

Figure 23A:
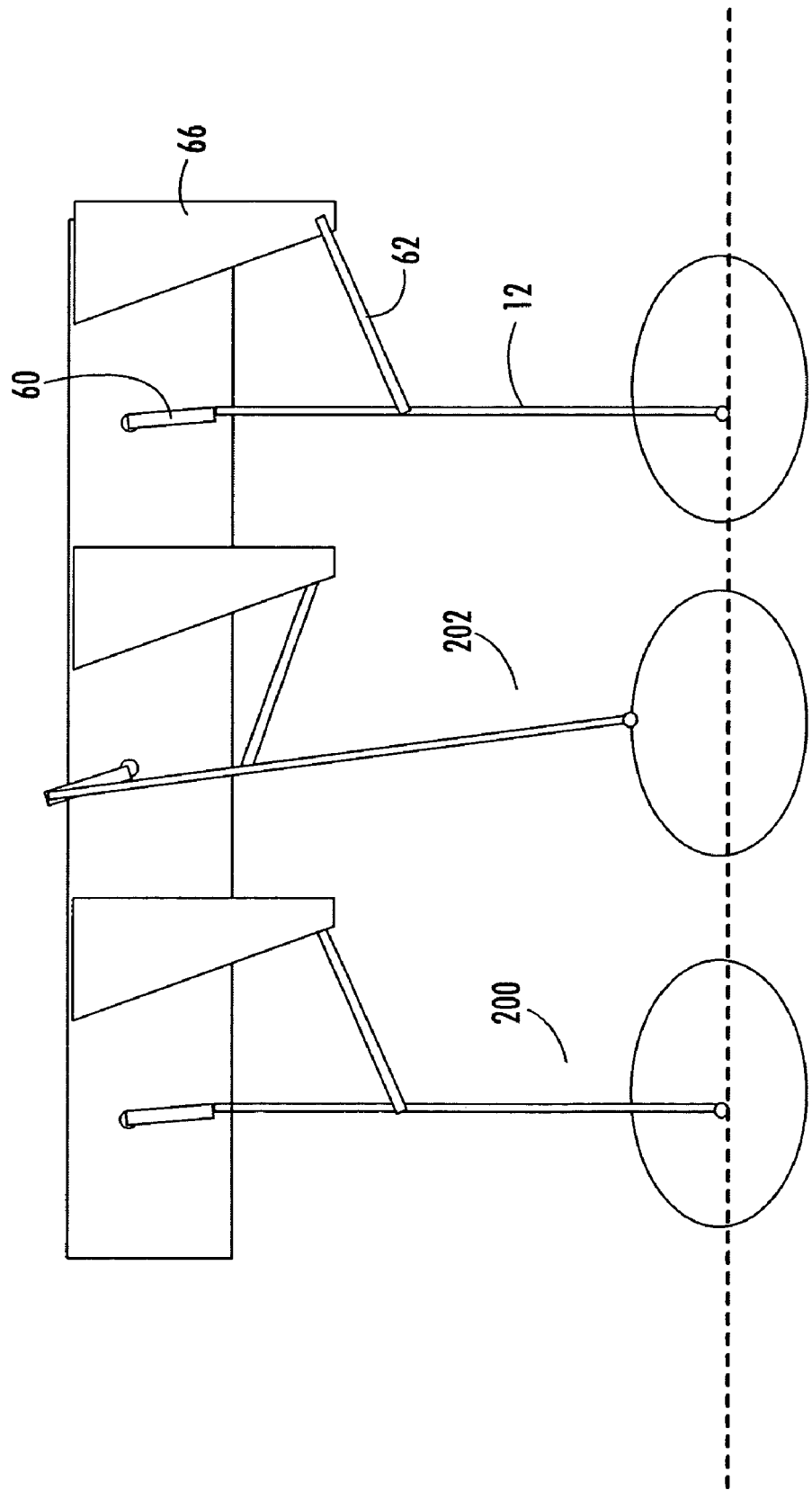

An analogous sequence of events occurs during walking and running (terrestrial operation), described by the illustrative FIGS. 23A-22B. A tripod gait with the same assignment of legs to form two sets of three legs (tripods) is again used to illustrate walking. In FIG. 23A, leg 200 is in mid stance and leg 202 is in mid flight. In FIG. 23B, leg 200 is in mid flight and leg 202 is in mid stance.

The tripod legs that are in stance are compressed by the body weight. In the walking gait, one tripod touches the ground before the other tripod lifts off, providing a continuous support for the robot. Running is a more dynamic variant of this gait, which undergoes a similar sequences except that one tripod lifts off, and for a period of time none of the legs are touching the ground, before the other tripod touches the ground. Typically in the running version of this gait, the legs that are in contact with the ground are compressed more than in the walking gait, due to the additional vertical dynamic forces, caused by the larger vertical oscillation of the robot body. Like in the climbing mode, other gaits are possible, that are either inspired by biology, like the pace, the trot or the bound gait, that might not employ all six legs, or other gaits that are not typically used by animals.

Based on the leg design of the subject invention, the overall robot design has two functionally different operating regimes: climbing when the legs are spread out (sprawled posture for scansorial locomotion (FIG. 8)) and walking or running (mammalian posture for terrestrial locomotion, FIG. 9). However, the leg angle can be adjusted for any intermediate position between these two extremes. In fact, the leg angles will be continuously moving by small amounts in any locomotion gait to attach/detach the leg from the wall, or to a lesser degree during running, unless large obstacles must be cleared by moving the legs sideways.

Each leg is a standard four-bar linkage with one degree of freedom. The resulting four-bar motion traces a foot (foot path) suitable for climbing and walking, when the linkage parameters are properly selected. This is illustrated in FIGS. 16-18.

During scansorial and terrestrial operation, different portions of the fixed toe path are used, as illustrated. During climbing, as the legs are attached to the wall by means of claws or other effectors, the toe trajectory is forced to deviate from the shown path, and follow the straight line dashed path. The straight line is a simplifying illustration—the actual path can vary in practice depending on the exact timing of foot engagement, foot slip, and leg compliance. This creates, by virtue of compliance in the four-bar leg, a lateral force which serves to engage the effectors with the walls, and help support the robot weight during climbing.

In one preferred embodiment, two motors are used in combination to actuate the two degrees of freedom of the robotic hip. The planar rotation of the four bar mechanism is referred to as the leg revolute degree of freedom, the rotation of the entire four bar mechanism along the axis of the robot's length (or roll axis) is referred to as the sprawl degree of freedom. The motors drive coupler gears 54 and 56, FIGS. 10-15. If both gear sets are rotated in the same direction at equal speeds, the output gear moves around the differential, in turn moving only the sprawl degree of freedom. If both gear sets are rotated in the opposite direction at equal speeds, the output gear rotates about its center axis, in turn rotating leg crank 60. Any other combination of relative gear speeds produces a combination of both sprawl and leg revolute actuation. Thus, both degree of freedom can be actuated simultaneously.

When climbing, a combined crank motion and ad/abduction motion is desired. The crank produces the toe path along the ellipsoidal trajectory which propels the robot upward, and also helps produce the inward gripping forces as shown in FIGS. 16 and 18. The ad/abduction motion lifts the feet off the ground when necessary before the legs are swept backwards, and also pushes the feet/claws into the ground at the desired instant along the foot trajectory.

When walking, ad/abduction is not required. Ad/abduction can, however, be used to help stabilize the robot (roll, yaw) if needed, plus it can be used to help the legs to clear obstacles. When walking the legs are pointing roughly downwards and can be perpendicular to the ground or slightly angled outward to improve the stability. The leg movement can be caused purely by the crank plus the four bar linkage and is in the linkage plane (which is generally perpendicular to the ground along the midline of the robot).

The subject invention thus provides a robot and a robot leg mechanism which allows the robot to both walk and/or run and also to climb. A minimum of actuators are required and the robot can be made very compact, lightweight, reliable, and manufactured at a low cost. The simpler and yet more versatile robot of the subject invention is effected by legs which abduct widely to assume a sprawled posture for wall climbing and which adduct to assume an upright walking posture combined with a linkage configured to operate in connection with the abduction/adduction hip mechanism to move the legs a long a predetermined optimal path for wall climbing.

Although specific features of the invention are shown in some drawings and not in others, however, this is for convenience only as each feature may be combined with any or all of the other features in accordance with the invention. The words "including", "comprising", "having", and "with" as used herein are to be interpreted broadly and comprehensively and are not limited to any physical interconnection. Moreover, any embodiments disclosed in the subject application are not to be taken as the only possible embodiments. Other embodiments will occur to those skilled in the art and are within the following claims.

In addition, any amendment presented during the prosecution of the patent application for this patent is not a disclaimer of any claim element presented in the application as filed: those skilled in the art cannot reasonably be expected to draft a claim that would literally encompass all possible equivalents, many equivalents will be unforeseeable at the time of the amendment and are beyond a fair interpretation of what is to be surrendered (if anything), the rationale underlying the amendment may bear no more than a tangential relation to many equivalents, and/or there are many other reasons the applicant can not be expected to describe certain insubstantial substitutes for any claim element amended:

What is claimed is:

1. A robot leg mechanism comprising:
   a leg;
   a hip connected to the leg and configured to abduct and adduct the leg, the hip including:
      a rotatable frame portion,
      a pair of coupler gears, and
      an output gear engaging the pair of coupler gears;
   a linkage configured to rotate the leg along a predetermined path, the linkage including:
      a crank rotatably connected to the leg and driven by the output gear when the pair of coupler gears are driven in opposite directions and at the same speed to rotate the leg along the predetermined path,
      a first member pivotably connected to the leg, and
      a second member pivotably connected to the first member and connected to the frame portion; and
   a shaft coupled to the pair of coupler gears and the rotatable frame portion, the frame portion rotating about the shaft when the pair of coupler gears are driven in the same direction and at the same speed to abduct and adduct the leg;
   the coupler gears rotatable in the same or opposite directions at different speeds to both rotate the frame portion and turn the output gear to abduct and adduct the leg while rotating the leg along the predetermined path.

2. The robot leg mechanism of claim 1 further including an actuator for each coupler gear.

3. The robot leg mechanism of claim 2 in which the actuators are motors each including a pinion gear engaging an input gear which is fixed to a coupler gear.

4. The robot leg mechanism of claim 3 in which the motors are arranged serially.

5. The robot leg mechanism of claim 1 further including a foot assembly connected to the leg.

6. The robot leg mechanism of claim 5 further including a compliant interface between the foot assembly and the leg.

7. The robot leg mechanism of claim 6 in which the compliant interface includes a first spring.

8. The robot leg mechanism of claim 7 in which the first spring is a leaf spring configured to bend in the direction of the longitudinal axis of the leg.

9. The robot leg mechanism of claim 7 in which the compliant interface includes a second spring.

10. The robot leg mechanism of claim 9 in which the second spring is a torsional spring.

11. The robot leg mechanism of claim 10 in which the torsional spring is configured to flex in a direction transverse to a longitudinal axis of the leg.

12. The robot leg mechanism of claim 5 in which the foot assembly includes a walking toe.

13. The robot leg mechanism of claim 5 in which the foot assembly further includes at least one of an adhesion material, a gripping mechanism, a suction mechanism, and a magnetic mechanism for vertical climbing.

\* \* \* \* \*